United States Patent
Lord, III et al.

(10) Patent No.: US 8,936,686 B2
(45) Date of Patent: Jan. 20, 2015

(54) METHOD FOR REMOVING MERCURY CONTAMINATION FROM SOLID SURFACES

(75) Inventors: Charles John Lord, III, Bartlesville, OK (US); Lars Torsten Lambertsson, Umea (SE); Erik Lennart Bjorn, Umea (SE); Wolfgang Frech, Umea (SE)

(73) Assignee: ConocoPhillips Company, Houston, TX (US)

( * ) Notice: Subject to any disclaimer, the term of this patent is extended or adjusted under 35 U.S.C. 154(b) by 714 days.

(21) Appl. No.: 13/227,800

(22) Filed: Sep. 8, 2011

(65) Prior Publication Data
US 2012/0073601 A1  Mar. 29, 2012

Related U.S. Application Data
(60) Provisional application No. 61/385,855, filed on Sep. 23, 2010.

(51) Int. Cl.
| | |
|---|---|
| B08B 7/04 | (2006.01) |
| C10G 21/12 | (2006.01) |
| C22B 43/00 | (2006.01) |
| C22B 7/00 | (2006.01) |
| C23G 5/028 | (2006.01) |

(52) U.S. Cl.
CPC ............... C22B 43/00 (2013.01); C22B 7/006 (2013.01); C23G 5/02893 (2013.01)
USPC ........ 134/10; 134/2; 134/11; 134/26; 134/27; 208/251 R; 208/290; 208/293

(58) Field of Classification Search
USPC .................... 134/2, 10, 11, 26, 27, 34, 42; 208/251 R, 290, 293
See application file for complete search history.

(56) References Cited

U.S. PATENT DOCUMENTS
| | | | |
|---|---|---|---|
| 4,764,219 A * | 8/1988 | Yan ................................. 134/2 |
| 4,880,527 A * | 11/1989 | Audeh ..................... 208/251 R |
| 4,962,276 A | 10/1990 | Yan |
| 5,037,552 A | 8/1991 | Furuta et al. |
| 6,059,855 A | 5/2000 | Luther et al. |
| 6,268,543 B1 | 7/2001 | Sakai et al. |
| 6,685,824 B2 | 2/2004 | Frankiewicz et al. |

FOREIGN PATENT DOCUMENTS
| | | |
|---|---|---|
| GB | 2387391 | 10/2003 |
| GB | 2429500 | 2/2007 |
| JP | 56133431 | 10/1981 |
| JP | 2003088847 | 3/2003 |
| RU | 2276197 | 5/2006 |
| WO | 0069991 | 11/2000 |

OTHER PUBLICATIONS
PCT Notification of Transmittal of the International Search Report and the Written Opinion of the International Searching Authority, or the Declaration, International Application No. PCT/US2011/050797, International filing date Sep. 8, 2011, 16 pages.

* cited by examiner

*Primary Examiner* — Saeed T Chaudhry
(74) *Attorney, Agent, or Firm* — ConocoPhillips Company

(57) ABSTRACT

A method of selecting a mercury-contaminated solid surface followed by heating a cleaning solution to a temperature less than 100° C. The cleaning solution can contain hydrocarbon oil and one or more organic sulfur compounds. Afterwards, the heated cleaning solution is contacted with the mercury-contaminated solid surface to remove the mercury contamination.

12 Claims, 3 Drawing Sheets

METHOD FOR REMOVING MERCURY CONTAMINATION FROM SOLID SURFACES

CROSS-REFERENCE TO RELATED APPLICATIONS

This application is a non-provisional application which claims the benefit of and priority to U.S. Provisional Application Ser. No. 61/385,855 filed Sep. 23, 2010, entitled "Method for Removing Mercury Contamination from Solid Surfaces," which is hereby incorporated by reference in its entirety.

STATEMENT REGARDING FEDERALLY SPONSORED RESEARCH OR DEVELOPMENT

None.

FIELD OF THE INVENTION

A cleaning method for removing mercury contamination from solid surfaces.

BACKGROUND OF THE INVENTION

Mercury is often present in natural gas, petrochemical and some refinery feed steams. Petroleum reservoirs in some regions of world (e.g., North Sea, Asia) contain elevated concentrations of mercury. Further, many deeper, hotter reservoir zones that contain elevated mercury concentrations are being produced as shallower, cooler zones are depleted.

This mercury contamination is becoming a significant problem for upstream and downstream operations in the petroleum industry. The petroleum-wetted surfaces of equipment (e.g., pipes, valves, vessels) and processing materials (e.g., catalyst particles, separator solids) in refineries and gas plants that process mercury-containing feed stocks become contaminated with such mercury compounds. These contaminated surfaces must be cleaned periodically to remove the mercury compounds from the equipment and processing materials.

Traditionally, steam cleaning has been used to clean water-soluble forms of mercury. However, steam cleaning fails to remove insoluble forms of mercury (e.g., HgS). Further, the elevated temperature of steam vaporizes elemental mercury into the air, which creates a significant health hazard for any employees in the vicinity of the cleaning operation.

Other cleaning procedures utilize water-based mixtures of oxidizing agents and complexing agents to solubilize the mercury. These corrosive solutions cannot be used on most plant equipment (e.g., pipes, valves, vessels) without seriously damaging the metal surfaces.

Accordingly, a safe, noncorrosive cleaning process is needed to remove mercury contamination from solid surfaces and hydrocarbon oils.

SUMMARY OF THE INVENTION

A method of selecting a mercury-contaminated solid surface followed by heating a cleaning solution to a temperature less than 100° C. The cleaning solution can contain hydrocarbon oil and one or more organic sulfur compounds. Afterwards, the heated cleaning solution is contacted with the mercury-contaminated solid surface to remove the mercury contamination.

In an alternate embodiment the method teaches selecting a mercury-contaminated solid surface followed by heating a cleaning solution to a temperature less than 100° C. In this embodiment the cleaning solution contains a hydrocarbon oil and one or more organic sulfur compounds. The heated cleaning solution is then contacted over the mercury-contaminated solid surface to remove the mercury contamination and to produce a used cleaning solution. The used cleaning solution is heated to a temperature greater than 100° C. and purged with a gas to regenerate the used cleaning solution. The used cleaning solution is then reused as cleaning solution.

These and other objects, features, and advantages will become apparent as reference is made to the following detailed description, preferred embodiments, and examples, given for the purpose of disclosure, and taken in conjunction with the accompanying drawings and appended claims.

BRIEF DESCRIPTION OF THE DRAWINGS

For a further understanding of the nature and objects of the present inventions, reference should be made to the following detailed disclosure, taken in conjunction with the accompanying drawings, in which like parts are given like reference numerals, and wherein.

DETAILED DESCRIPTION OF PREFERRED EMBODIMENTS OF THE INVENTIONS

The following detailed description of various embodiments of the present invention references the accompanying drawings, which illustrate specific embodiments in which the invention can be practiced. While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto to be limited to the examples and descriptions set forth herein but rather that the claims be construed as encompassing all the features of patentable novelty which reside in the present invention, including all features which would be treated as equivalents thereof by those skilled in the art to which the invention pertains. Therefore, the scope of the present invention is defined only by the appended claims, along with the full scope of equivalents to which such claims are entitled.

In an embodiment, solid surfaces that are contaminated with mercury may be extractively cleaned using heated, hydrocarbon oils that contain one or more organic sulfur compounds. The contaminated solid surfaces may be continuous (e.g., pipes, valves, vessels) or granular (e.g., soils, catalyst particles, separator solids) or. The solid surfaces may be continuous, granular or combinations thereof.

Elemental mercury and mercury compounds (e.g., HgS, HgO) may be extracted from the contaminated solid surfaces into the oil phase. Mercuric sulfide (HgS), which is extremely difficult to dissolve in a water-based solution, is significantly more soluble in hydrocarbon solutions. Accordingly, the mercury contaminate may be elemental mercury, ionic mercury (i.e., $Hg^{+2}$) or mixtures thereof.

The rate of extraction increases with temperature, however, the temperature should not exceed 100° C. for efficient cleaning At temperatures below about 100° C., elemental mercury spontaneously oxidizes to ionic mercury (i.e., $Hg^{+2}$) in a hydrocarbon oil. At temperatures above about 100° C., ionization reaction reverses and ionic mercury is reduced to elemental mercury, which is not the desired form for the cleaning process for solid surfaces.

The cleaning solution comprises a hydrocarbon oil and one or more organic sulfur compounds. The hydrocarbon oil may be selected from the group consisting of crude oils, fuel oils, mineral oils, kerosene, naphtha, diesel, gasoline and mixtures thereof. In an embodiment, the hydrocarbon oil may be a crude oil. Many natural crude oils contain enough active organic sulfur compounds to function as a mercury cleaning solution.

In another embodiment, the hydrocarbon oil may be a mineral oil. Mineral oils (e.g., branched synthetic alkanes) are a suitable solvent to ensure thermal stability of the hydrocarbon oil and to minimize the vapor pressure of the hydrocarbons.

Figure 1:
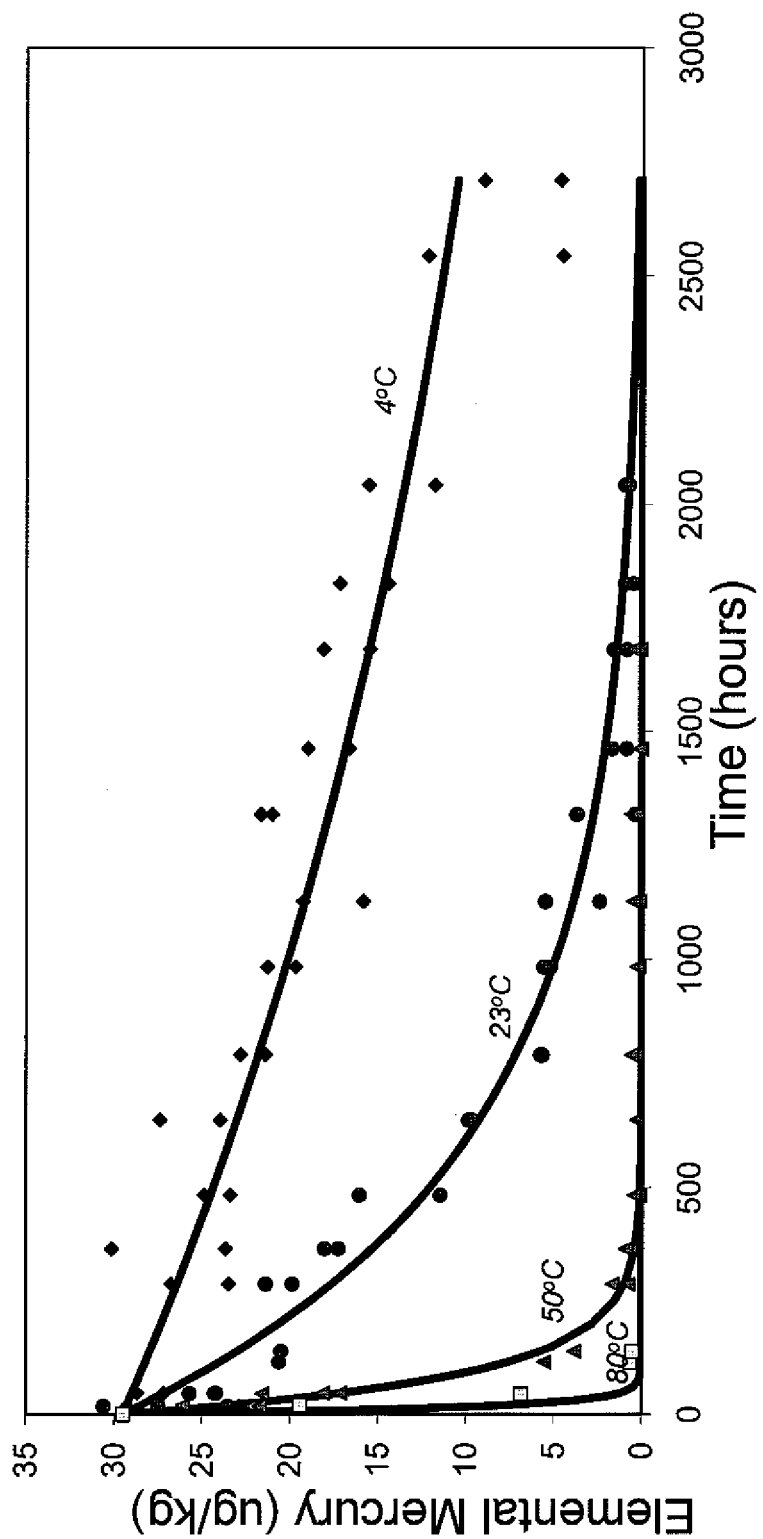
FIG. 1 is a chart showing oxidation of elemental mercury to ionic mercury in a cleaning solution at various temperatures.

A chart showing the effect of temperature on the oxidation rate of elemental mercury to ionic mercury in an exemplary cleaning solution is illustrated in FIG. 1. In these examples, the cleaning solution comprised crude oil with a total sulfur concentration of 2,500 parts per million (as sulfur). The cleaning solution was heated to 4° C., 23° C., 50° C. and 80° C. to determine the rate of elemental mercury extraction into the solution at various temperatures. The data is shown in Table 1.

TABLE 1

Data for Oxidation of Elemental Mercury to Ionic Mercury in Cleaning Solution at 4° C., 23° C., 50° C. and 80° C.

| Temperature of Cleaning Solution (° C.) | Time (hours) | Concentration of Elemental Mercury in Nitrogen (µg/kg) | Concentration of Elemental Mercury in Air (µg/kg) |
| --- | --- | --- | --- |
| 4 | 0.0 | 29.52 | 29.52 |
| 4 | 17.0 | 22.89 | 29.27 |
| 4 | 46.0 | 27.21 | 28.70 |
| 4 | 287.5 | 23.51 | 26.78 |
| 4 | 365.5 | 30.17 | 23.68 |
| 4 | 483.5 | 23.43 | 24.89 |
| 4 | 647.5 | 24.01 | 27.41 |
| 4 | 790.0 | 22.86 | 21.42 |
| 4 | 983.5 | 21.31 | 19.72 |
| 4 | 1127.5 | 19.31 | 15.87 |
| 4 | 1318.5 | 21.70 | 21.05 |
| 4 | 1462.5 | 19.03 | 16.67 |
| 4 | 1680.5 | 15.50 | 18.15 |
| 4 | 1825.5 | 14.48 | 17.21 |
| 4 | 2042.5 | 11.79 | 15.58 |
| 4 | 2544.0 | 4.53 | 12.21 |
| 4 | 2710.0 | 4.66 | 9.00 |
| 23 | 0.0 | 29.52 | 29.52 |
| 23 | 17.0 | 23.56 | 30.60 |
| 23 | 19.0 | | 27.50 |
| 23 | 45.0 | | 25.72 |
| 23 | 46.0 | 24.22 | 24.29 |
| 23 | 115.5 | | 20.63 |
| 23 | 139.0 | | 20.51 |
| 23 | 287.5 | 19.88 | 21.38 |
| 23 | 365.5 | 18.04 | 17.26 |
| 23 | 483.5 | 11.46 | 16.06 |
| 23 | 647.5 | 9.83 | 9.64 |
| 23 | 790.0 | 5.76 | 5.65 |
| 23 | 983.5 | 5.58 | 5.21 |
| 23 | 1127.5 | 5.49 | 2.41 |
| 23 | 1318.5 | 3.72 | 0.40 |
| 23 | 1462.5 | 1.72 | 0.90 |
| 23 | 1680.5 | 1.65 | 0.87 |
| 23 | 1825.5 | 0.52 | 1.00 |
| 23 | 2042.5 | 1.00 | 0.74 |
| 23 | 2544.0 | | |
| 23 | 2710.0 | | |
| 50 | 0.0 | 29.52 | 29.52 |
| 50 | 17.0 | 22.23 | 21.71 |
| 50 | 19.0 | | 26.11 |
| 50 | 45.0 | | 21.58 |
| 50 | 46.0 | 17.16 | 18.13 |
| 50 | 115.5 | | 5.53 |
| 50 | 139.0 | | 3.83 |
| 50 | 287.5 | 1.65 | 0.76 |
| 50 | 365.5 | 0.57 | 0.89 |
| 50 | 483.5 | 0.11 | 0.40 |
| 50 | 647.5 | 0.29 | 0.26 |
| 50 | 790.0 | 0.27 | 0.59 |
| 50 | 983.5 | 0.18 | 0.30 |
| 50 | 1127.5 | 0.13 | 0.51 |
| 50 | 1318.5 | 0.63 | 0.34 |
| 50 | 1462.5 | 0.06 | 0.15 |
| 50 | 1680.5 | 0.12 | 0.54 |
| 50 | 1825.5 | | |
| 50 | 2042.5 | | |
| 50 | 2544.0 | | |
| 50 | 2710.0 | | |
| 80 | 0.0 | | 29.52 |
| 80 | 17.0 | | |
| 80 | 19.0 | | 19.45 |
| 80 | 45.0 | | 6.82 |
| 80 | 46.0 | | |
| 80 | 115.5 | | 0.64 |
| 80 | 139.0 | | 0.52 |
| 80 | 287.5 | | |
| 80 | 365.5 | | |
| 80 | 483.5 | | |
| 80 | 647.5 | | |
| 80 | 790.0 | | |
| 80 | 983.5 | | |
| 80 | 1127.5 | | |
| 80 | 1318.5 | | |
| 80 | 1462.5 | | |
| 80 | 1680.5 | | |
| 80 | 1825.5 | | |
| 80 | 2042.5 | | |
| 80 | 2544.0 | | |
| 80 | 2710.0 | | |

As shown in FIG. 1, the rate of elemental mercury extraction into the cleaning solution increases with temperature, however, the temperature should not exceed 100° C., as discussed above. In an embodiment, the cleaning solution may be heated to a temperature of no more than about 100° C. In another embodiment, the solution may be heated to a temperature between about 50° C. and about 100° C. In a preferred embodiment, the solution may be heated to a temperature between about 80° C. and about 100° C.

The cleaning solution should have a sufficient concentration of organic sulfur compounds to provide at least some cleaning power. In an embodiment, the hydrocarbon oil has a total sulfur content of at least 100 parts per million (as sulfur). In another embodiment, the hydrocarbon oil has a total sulfur content of between about 100 parts per million (as sulfur) and about 10,000 parts per million (as sulfur). In a preferred embodiment, the hydrocarbon oil has a total sulfur content of between about 500 parts per million (as sulfur) and about 5,000 parts per million (as sulfur).

If the hydrocarbon oil does not contain a sufficient concentration of organic sulfur compounds or if more cleaning power is required, then one or more organic sulfur compounds may be added to the hydrocarbon oil as desired. The organic sulfur compound may be selected from the group consisting of sulfides, disulfides, polysulfides, thiols (aka mercaptans), thiophenes and mixtures thereof. These compounds are quite soluble in hydrocarbon oils, and may be added to produce a wide range of concentrations.

Organic sulfides, disulfides, polysulfides and thiols (aka mercaptans) are quite effective in the cleaning process and provide a high degree of mercury extraction from solid surfaces. Other organic sulfur compound types (e.g., thiophenes) are less effective in the process, but nevertheless provide some degree of mercury extraction.

Figure 2:
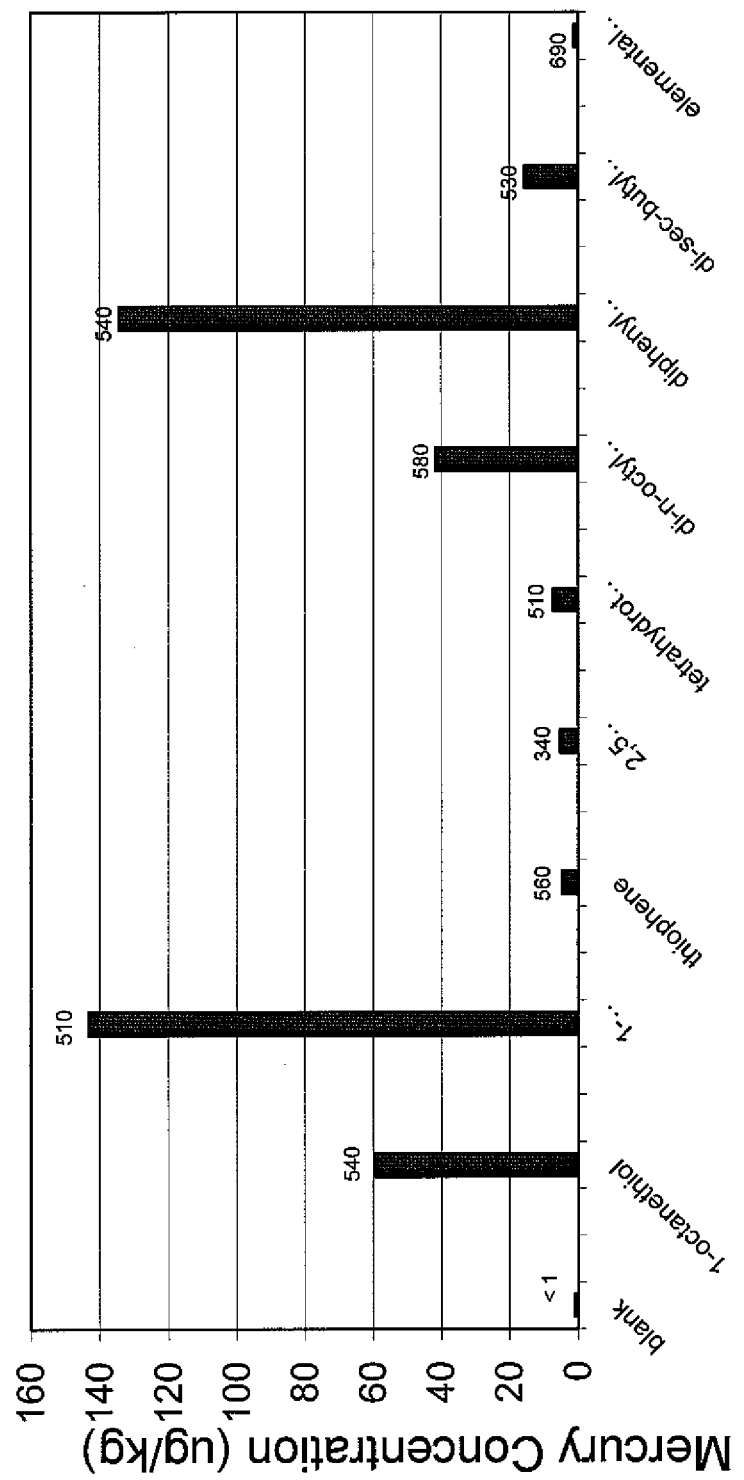
FIG. 2 is a chart showing solubility of mercuric sulfide in cleaning solutions at 25° C.

A chart showing the complexing effect of organic sulfur compounds in exemplary cleaning solutions at 25° C. is illustrated in FIG. 2. In these examples, the cleaning solutions comprised isooctane and organic sulfur compounds as shown in Table 2. The data is shown in Table 3.

TABLE 2

Concentration of Organic Sulfur Compounds in Cleaning Solution.

| Compound | Concentration in Cleaning Solution (parts per million) |
| --- | --- |
| blank | <1 |
| 1-octanethiol | 540 |
| 2-dodecanethiol | 510 |
| thiophene | 560 |
| 2,5-dimethyl thiophene | 340 |
| tetrahydrothiophene | 510 |
| di-n-octyl sulfide | 580 |
| diphenyl sulfide | 540 |
| di-sec-butyl disulfide | 530 |
| elemental sulfur | 690 |

TABLE 3

Data for Mercuric Sulfide Solubility in Cleaning Solution With Various Organic Sulfur Compounds.

| Temperature of Hydrocarbon Solution (° C.) | Compound | Concentration of Mercuric Sulfide (HgS) in Cleaning Solution (µg/kg) |
| --- | --- | --- |
| 25 | blank | 1.0 |
| 25 | 1-octanethiol | 59.7 |
| 25 | 1-dodecanethiol | 143.3 |
| 25 | thiophene | 4.7 |
| 25 | 2,5-dimethyl thiophene | 5.3 |
| 25 | tetrahydrothiophene | 7.3 |
| 25 | di-n-octyl sulfide | 41.7 |
| 25 | diphenyl sulfide | 134.3 |
| 25 | di-sec-butyl disulfide | 15.7 |
| 25 | elemental sulfur | 1.3 |

As shown in FIG. 2, the organic sulfur compounds significantly increase the solubility of mercuric sulfide (HgS) in the cleaning solution. The organic sulfur compounds in the hydrocarbon oil complex the ionic mercury and keep it solubilized in the oil phase. In addition to solubilizing the ionic mercury, the organic sulfur compounds accelerate the oxidation rate of the elemental mercury to ionic mercury by removing the ions from the solid surface, which is beneficial to the cleaning process.

The cleaning solution may be continuously recirculated across the contaminated surface until the desired level of cleaning is achieved.

In another embodiment, hydrocarbon solutions that are contaminated with mercury (including the cleaning solution discussed above) may be cleaned by heating the hydrocarbon solution to at least 100° C. and passing a purge gas through the heated solution. The mercury contaminate may be elemental mercury, ionic mercury (i.e., $Hg^{+2}$) or mixtures thereof. The purge gases may be selected from the group consisting of nitrogen, carbon dioxide, methane, ethane, propane, butane, natural gas, flue gas and mixtures thereof.

The rate of purge increases with temperature, however, the temperature should not exceed the decomposition temperature for the hydrocarbon oil. At temperatures above 100° C., the ionic mercury is spontaneously reduced to elemental mercury, which may be purged from the solution as mercury vapor. Further, the temperature should not drop below 100° C. because, at temperatures below 100° C., the reduction reaction reverses and elemental mercury spontaneously oxides to ionic mercury (i.e., $Hg^{+2}$) in a hydrocarbon matrix, which is not the desired form for the cleaning process for hydrocarbon solutions.

The hydrocarbon solution comprises a hydrocarbon oil and on or more organic sulfur compounds. The hydrocarbon oil may be selected from the group consisting of crude oils, fuel oils, mineral oils, kerosene, naphtha, diesel, gasoline and mixtures thereof. In an embodiment, the hydrocarbon oil may be a crude oil. Many natural crude oils contain enough active organic sulfur compounds to function as a mercury cleaning solution.

In another embodiment, the hydrocarbon oil may be a mineral oil. Mineral oils (e.g., branched synthetic alkanes) are a suitable solvent to ensure thermal stability of the hydrocarbon oil and to minimize the vapor pressure of the hydrocarbons.

The hydrocarbon oil should have a sufficient concentration of organic sulfur compounds to provide at least some cleaning power. In an embodiment, the hydrocarbon oil has a total sulfur content of at least 100 parts per million (as sulfur). In another embodiment, the hydrocarbon oil has a total sulfur content of between about 100 parts per million (as sulfur) and about 10,000 parts per million (as sulfur). In a preferred embodiment, the hydrocarbon oil has a total sulfur content of between about 500 parts per million (as sulfur) and about 5,000 parts per million (as sulfur).

If the hydrocarbon oil does not contain a sufficient concentration of organic sulfur compounds or if more cleaning power is required, then one or more organic sulfur compounds may be added to the hydrocarbon oil as desired. The organic sulfur compounds may be selected from the group consisting of sulfides, disulfides, polysulfides, thiols (aka mercaptans), thiophenes and mixtures thereof. These compounds are quite soluble in hydrocarbon oils, and may be added to produce a wide range of concentrations.

In an embodiment mercury that can be added to the hydrocarbon oil to clean a mercury-contaminated solid surface can be selected from the group consisting of thiols (aka mercaptans), sulfides, disulfides, oil soluble dithiocarbamates and mixtures thereof. Suitable mercury compounds include thiols (aka mercaptan) compounds with the general formula RSH in which R is an alkyl group containing from 4 to 30 carbon atoms, more preferably having from 8 to 20 carbon atoms. Examples of such thiol compounds include octanethiol, nonanethiol, decanethiol, undecanethiol, dodecanethiol, tridecanethiol, tetradecanethiol, pentadecanethiol, hexadecanethiol, heptadecanethiol, octadecanethiol, nonadecanethiol, and eicosanethiol and isomers and mixtures thereof. R could also be an aromatic group containing 6 or more carbon atoms. Examples of such aromatic thiol compounds include benzenethiol, toluenethiol, and xylenethiol and isomers and mixtures thereof.

Other suitable mercury compounds include sulfide compounds with the general formula R' SR" in which R' and R" are the same or different alkyl groups containing from 1 to 30 carbon atoms, and more preferably, having a total (R'+R") of 8 to 24 carbon atoms. Examples of such sulfide compounds include di-n-butyl sulfide, n-heptyl methyl sulfide, methyl n-octyl sulfide, di-n-pentyl sulfide, ethyl n-octyl sulfide, di-n-hexyl sulfide, n-dodecyl methyl sulfide, di-n-heptyl sulfide, di-n-octyl sulfide, di-n-nonyl sulfide, di-n-decyl sulfide, di-n-undecyl sulfide, and di-n-dodecyl sulfide and isomers and mixtures thereof. In another embodiment, R' and R" could also be the same or different aromatic groups containing 6 or more carbon atoms. Examples of such aromatic sulfide compounds include diphenyl sulfide and alkyl substituted diphenyl sulfides and mixtures thereof.

Additional suitable mercury compounds include disulfide compounds with the general formula R'SSR" in which R' and R" are the same or different alkyl groups containing from 1 to 30 carbon atoms, more preferably having a total (R'+R") of 6 to 24 carbon atoms. Examples of such disulfide compounds include di-n-propyl disulfide, di-n-butyl disulfide, di-sec-butyl disulfide, di-tert-butyl disulfide, di-n-pentyl disulfide, di-n-hexyl disulfide, di-n-heptyl disulfide, di-n-octyl disulfide, di-n-nonyl disulfide, di-n-decyl disulfide, di-n-undecyl disulfide, di-tert-dodecyl disulfide and isomers and mixtures thereof. R' and R" could also be the same or different aromatic groups containing 6 or more carbon atoms. Examples of such aromatic disulfide compounds include diphenyl disulfide and alkyl substituted diphenyl disulfides and mixtures thereof.

A purge gas is passed through the heated, hydrocarbon solution to purge the mercury vapor from the solution into the gas phase. The purge gas may be selected from the group consisting of nitrogen, carbon dioxide, methane, ethane, propane, butane, natural gas, flue gas and mixtures thereof.

After being purged from the hydrocarbon oil, the mercury vapor may recondensed or trapped using a mercury scavenging medium. In an embodiment, the mercury condenser has a temperature of no more than about 30° C. In another embodiment, the mercury condenser has a temperature of between about 5° C. and about 30° C. In a preferred embodiment, the condenser has a temperature of between about 5° C. and about 20° C.

After recondensing or trapping the mercury, the purge gas may be recirculated through the hydrocarbon oil until the desired level of cleaning is achieved.

Figure 3:
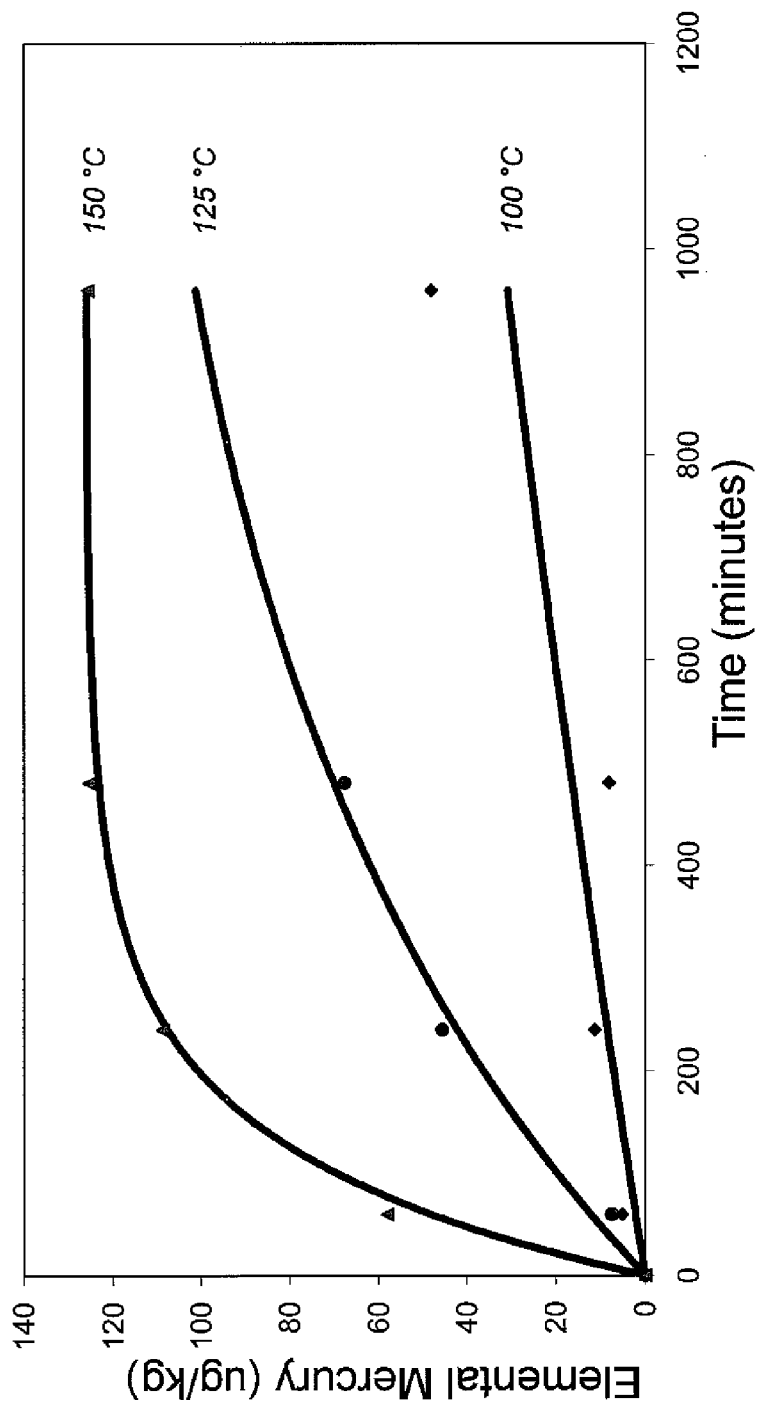
FIG. 3 is a chart showing reduction of ionic mercury to elemental mercury in a hydrocarbon solution at various temperatures.

A chart showing the reduction of ionic mercury to elemental mercury in an exemplary hydrocarbon solution at various temperatures is illustrated in FIG. 3. In these examples, the cleaning solution comprised mineral oil with a total sulfur concentration of <1 part per million. The hydrocarbon solution was heated to 100° C., 125° C. and 150° C. to determine the rate of reduction of ionic mercury to elemental mercury at various temperatures. The data is shown in Table 4.

TABLE 4

Data of Reduction of Ionic Mercury to Elemental Mercury in Hydrocarbon Solution at Various Temperatures.

| Temperature of Hydrocarbon Solution (° C.) | Time (minutes) | Concentration of Elemental Mercury (µg/kg) |
| --- | --- | --- |
| 100 | 0 | 0 |
| 100 | 60 | 5.18 |
| 100 | 240 | 11.32 |
| 100 | 480 | 8.20 |
| 100 | 960 | 48.07 |
| 125 | 0 | 0 |
| 125 | 60 | 7.46 |
| 125 | 240 | 45.61 |
| 125 | 480 | 67.92 |
| 125 | 960 | |
| 150 | 0 | 0 |
| 150 | 60 | 57.97 |
| 150 | 240 | 108.81 |
| 150 | 480 | 125.39 |
| 150 | 960 | 125.69 |

As shown in FIG. 3, the rate of ionic mercury reduction to elemental mercury increases with temperature, however, the temperature should not exceed the decomposition temperature of the hydrocarbon oil, as discussed above. In an embodiment, the hydrocarbon solution is heated to a temperature of at least about 100° C. In another embodiment, the solution is heated to a temperature between about 100° C. and the decomposition temperature of the hydrocarbon oil. In a preferred embodiment, the solution is heated to a temperature between about 125° C. and about 150° C.

Definitions

As used herein, the terms "a," "an," "the," and "said" means one or more.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone: A and B in combination; A and C in combination; B and C in combination; or A, B, and C in combination.

As used herein, the terms "comprising," "comprises," and "comprise" are open-ended transition terms used to transition from a subject recited before the term to one or elements recited after the term, where the element or elements listed after the transition term are not necessarily the only elements that make up of the subject.

As used herein, the terms "containing," "contains," and "contain" have the same open-ended meaning as "comprising," "comprises," and "comprise," provided above.

As used herein, the terms "having," "has," and "have" have the same open-ended meaning as "comprising," "comprises," and "comprise," provided above.

As used herein, the terms "including," "includes," and "include" have the same open-ended meaning as "comprising," "comprises," and "comprise," provided above.

As used herein, the term "simultaneously" means occurring at the same time or about the same time, including concurrently.

INCORPORATION BY REFERENCE

All patents and patent applications, articles, reports, and other documents cited herein are fully incorporated by reference to the extent they are not inconsistent with this invention.

What is claimed is:

1. A method of:
   a) selecting a mercury-contaminated solid surface; and
   b) heating a cleaning solution to a temperature less than 100° C., wherein the cleaning solution comprises:
      i. a hydrocarbon oil; and
      ii. one or more organic sulfur compounds;
   c) contacting the heated cleaning solution over the mercury-contaminated solid surface to remove the mercury contamination and to produce a used cleaning solution;
   d) heating the used cleaning solution to a temperature greater than 100° C. and purging the used cleaning solution with a gas to regenerate the used cleaning solution; and
   e) reusing the regenerated used cleaning solution as cleaning solution.

2. The method of claim 1, wherein the mercury-contaminate is elemental mercury, ionic mercury or mixtures thereof.

3. The method of claim 1, wherein the hydrocarbon solution is selected from the group consisting of crude oils, fuel oils, mineral oils, kerosene, naphtha, diesel, gasoline and mixtures thereof.

4. The method of claim 1, wherein the organic sulfur compound is selected from the group consisting of sulfides, disulfides, polysulfides, thiols, thiophenes and mixtures thereof.

5. The method of claim 1, wherein the purge gas is selected from the group consisting of nitrogen, carbon dioxide, methane, ethane, propane, butane, natural gas, flue gas and mixtures thereof.

6. The method of claim 1, wherein the hydrocarbon solution has a total sulfur content of at least about 100 parts per million.

7. The method of claim 1, wherein the hydrocarbon solution has a total sulfur content between about 100 parts per million and about 10,000 parts per million.

8. The method of claim 1, wherein the hydrocarbon solution has a total sulfur content of between about 500 parts per million and about 5,000 parts per million.

9. The method of claim 1, wherein the regeneration of the cleaning solution produces mercury vapor.

10. The method of claim 9, wherein the mercury vapor is recondensed with a condenser.

11. The method of claim 10, wherein the condenser has a temperature between about 5° C. and 20° C.

12. The method of claim 9, wherein the mercury vapor is trapped with a scavenging medium.

* * * * *